July 15, 1969  G. B. DAWSON  3,455,432
ARMOURED FLEXIBLE CONVEYORS
Filed June 28, 1967  5 Sheets-Sheet 1
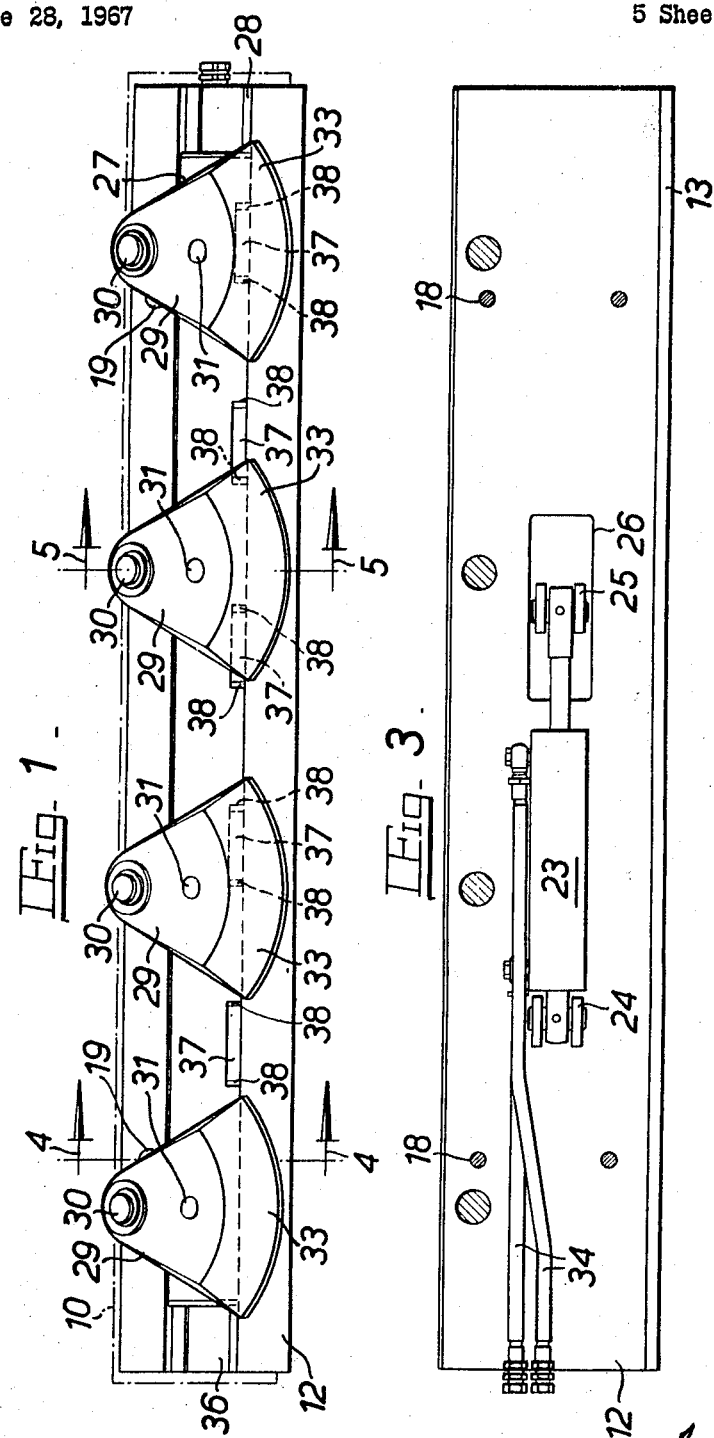

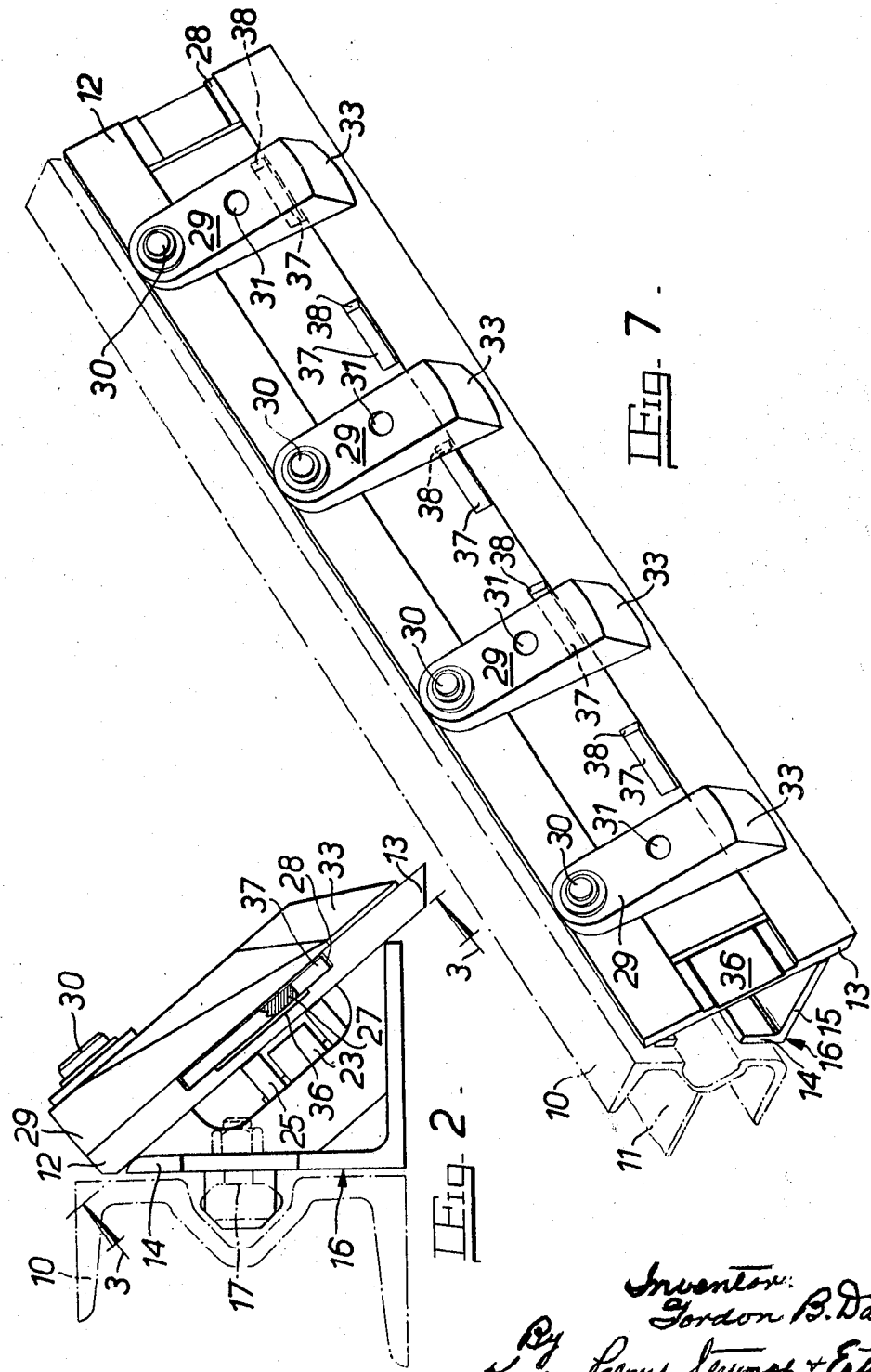

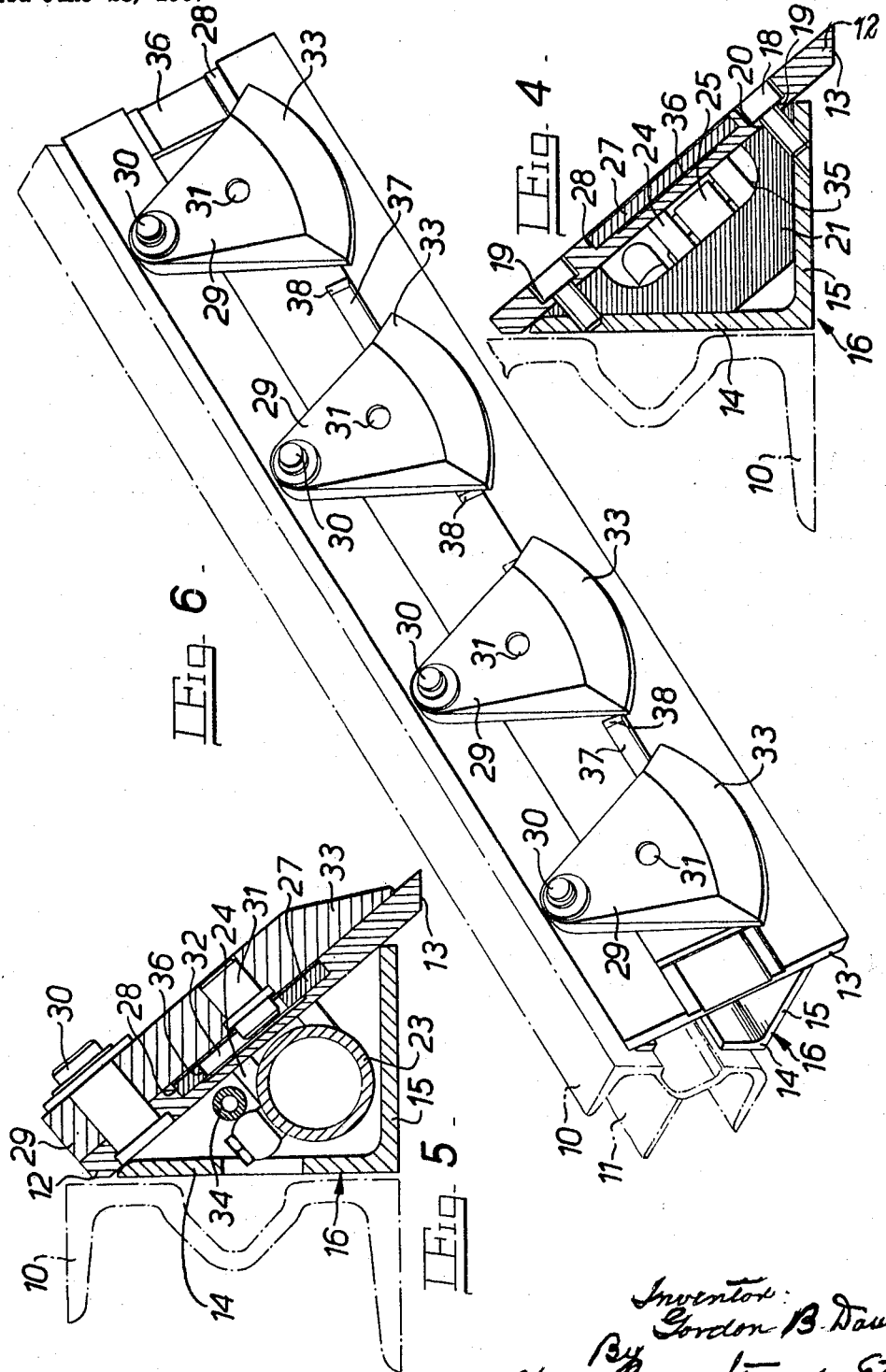

July 15, 1969   G. B. DAWSON   3,455,432
ARMOURED FLEXIBLE CONVEYORS
Filed June 28, 1967   5 Sheets-Sheet 4
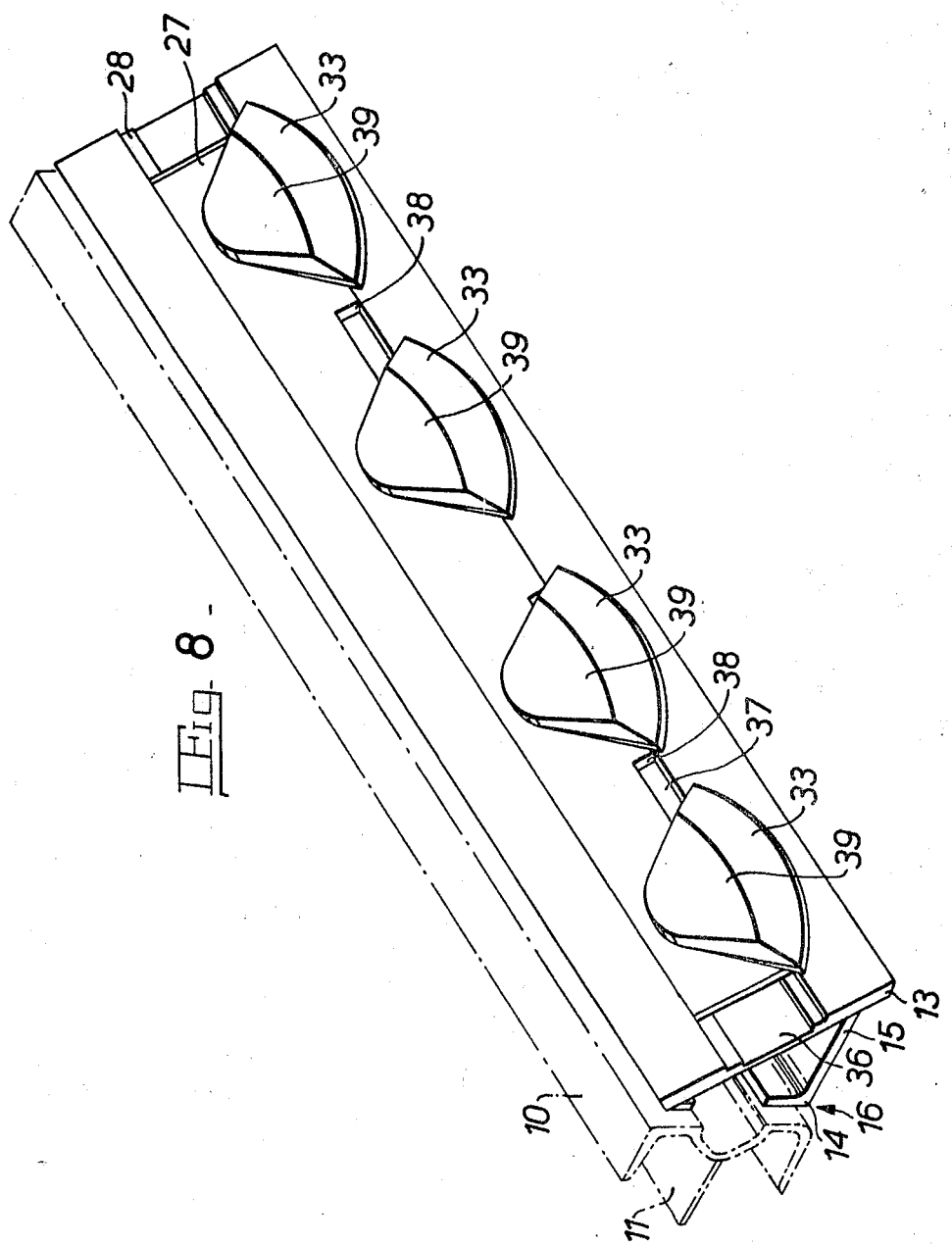

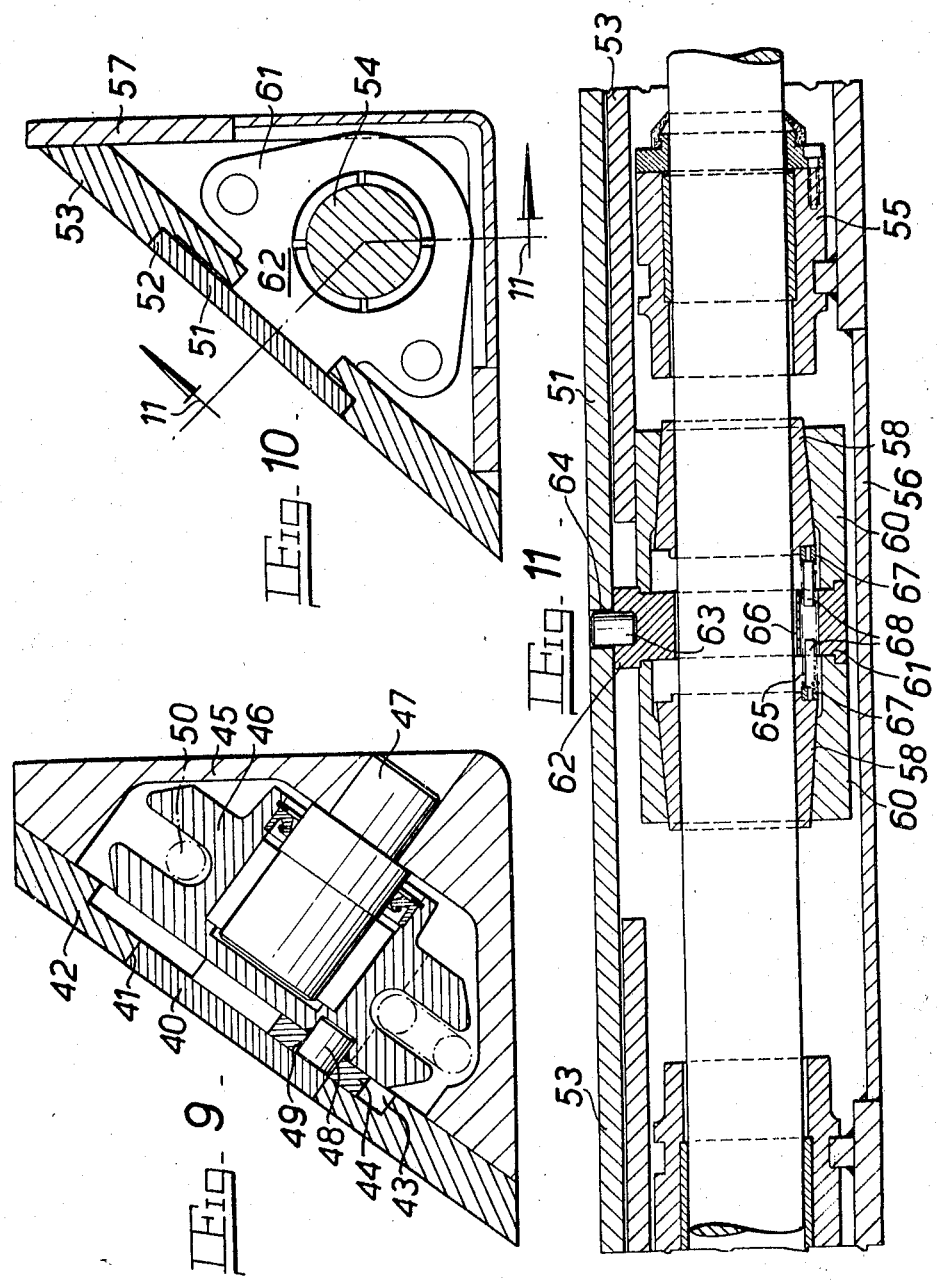

United States Patent Office 3,455,432
Patented July 15, 1969

3,455,432
ARMOURED FLEXIBLE CONVEYORS
Gordon Bertram Dawson, Worcester, England, assignor to Dowty Meco Limited, Worcester, England, a British company
Filed June 28, 1967, Ser. No. 649,527
Claims priority, application Great Britain, June 28, 1966, 28,831/66
Int. Cl. B65g 65/06; E21c 35/20
U.S. Cl. 198—9
14 Claims

ABSTRACT OF THE DISCLOSURE

An armoured conveyor has on a side adjacent to a working face a plurality of arms which are angularly movable or which can be reciprocated in a straight line to displace or sweep coal spillage from the side of the conveyor adjacent to the working face as the conveyor is advanced towards the face.

---

This invention relates to improvements in conveyors of the kind known as armoured flexible conveyors which are commonly used for conveying coal from the working face in a mine. More particularly the invention relates to improvements in conveyors of this kind comprising a series of pans connected by joints permitting a certain amount of transverse and vertical flexibility, and a scraper conveyor consisting of transverse scraper bars connected by chains slidably guided in the pans. The conveyor extends parallel and close to the working face and as the coal is cut back by a mining machine the conveyor is moved over by rams acting on the pans to follow up the face.

The movement of the conveyor is sometimes hindered or is, in some cases, prevented by coal which has been left on the floor by the mining machine and which may become lodged between the conveyor and the working face. It happens frequently that the presence of such coal spillage prevents the conveyor being advanced sufficiently close to the working face to ensure that a correct depth of cut is taken when the next traverse of the mining machine takes place.

According to our invention in a conveyor of the kind set forth a plurality of arms mounted on the outer side of the conveyor adjacent to the working face are movable in a direction substantially parallel to the main longitudinal axis of the conveyor at least when the conveyor is being advanced towards a working face, the arms at least during a part of their movements approaching closely or substantially contacting the surface of the floor between the conveyor and the working face to displace or sweep coal spillage away from the side of the conveyor adjacent to the working face so that movement of the conveyor towards the working face is facilitated.

The arms may be angularly movable about fixed points through arcs, or, alternatively the arms may comprise projections depending downwardly from members which are reciprocable in a direction parallel to the main axis of the conveyor.

Some embodiments of our invention are shown in the accompanying drawings in which:

FIGURE 1 is a side elevation of a ramp plate attached to one side of a pan of an armoured flexible conveyor;
FIGURE 2 is an end elevation of FIGURE 1;
FIGURE 3 is a section on the line 3—3 of FIGURE 2;
FIGURE 4 is a section on the line 4—4 of FIGURE 1;
FIGURE 5 is a section on the line 5—5 of FIGURE 1;
FIGURE 6 is an isometric view of the assembly shown in FIGURES 1 to 5;
FIGURE 7 is an isometric view similar to FIGURE 6 but showing a modification;
FIGURE 8 is a further isometric view showing another modification;
FIGURE 9 is a transverse section through a ramp plate showing in another form means for reciprocating a slide bar;
FIGURE 10 is a section similar to FIGURE 9 showing a further modified means for reciprocating a slide bar; and
FIGURE 11 is a section on the line 11—11 of FIGURE 10.

In the embodiment of FIGURES 1 to 6, a side member 10 of a pan of an armoured flexible conveyor shown in chain dotted lines is generally of sigma section and is held in rigid spaced relationship with a complementary side member (not shown) by a substantially horizontal deck plate 11. In an armoured flexible conveyor a series of such pans are connected at adjacent ends by joints permitting a certain amount of transverse and vertical flexibility, and a scraper conveyor consisting of transverse scraper bars connected by chains is slidably guided in the pans. When installed in a coal mine the conveyor extends parallel to the working face with the side members 10 of the pans adjacent to it.

According to our invention each pan of the armoured conveyor is provided, on the side of the conveyor adjacent to the working face, with a ramp plate 12 which extends downwardly and terminates substantially at floor level, the ramp plate being inclined away from the conveyor to act as a wedge and lift coal spillage to facilitate, to a certain extent, movement of the conveyor towards the working face. The lower or leading edge 13 of the ramp plate is chamfered in a direction parallel to the surface over which the conveyor is moved, and the ramp plate is held in the inclined position against the outer ends of flanges 14, 15 of a right angled bracket 16 of substantially the same length as the side member 10. The bracket 16 is secured to the side member 10 of the pan by a plurality of clamping bolts 17 which pass through spaced openings of constant pitch in the vertical flange 14 of the bracket. The ramp plate is held in position by bolts 18 which pass through spaced openings 19 in the ramp plate and are received in tapped holes 20 in spaced mounting members 21, 22 which are located adjacent to opposite ends of the bracket and are fixed between the flanges of the bracket.

A double acting hydraulically or pneumatically operated ram 23 housed within the space between the bracket and the ramp plate 12 is received at one end in a bifurcated fitting 24 secured to the ramp plate and at the other end is connected to bifurcated fitting 25 which extends through a slot 26 of substantial axial length in the ramp plate 12. The bifurcated fitting 25 is secured to the inner face of a slide bar 27 which is of a length shorter than that of the ramp plate 12. The slide bar 27 is slidably mounted for movement in an axial direction in a groove or recess 28 in the outer surface of the ramp plate 12 and the groove or recess 28 is of a depth substantially equal to or slightly greater than the thickness of the slide bar 27 so that the outer surface of the slide bar is aligned substantially with the outer surface of the ramp plate 12.

A plurality of sector shaped arms 29 are each pivotally connected at their radially innermost ends at equally spaced positions on the ramp plate 12 above the slide bar 27, on trunnion pins 30 and at intermediate points in their radial lengths the arms are connected to the slide bar 27 by impulsion pins 31 which at their inner ends are received in radial slots 32 in the slide bar. The arms 29 are substantially parallel to the plane of the ramp plate and are adapted to traverse arcs on the outer surface of the ramp plate 12. The dimensions of the slots 32 are chosen so as to prevent relative movement between the impulsion pins 31 and the slide bar in an axial direction but to allow relative movement therebetween in a radial direction with angular movement of the arms 29 about the trunnion pins 30 as pivots. The curved radially outer end 33 of each arm is bevelled or chamfered and terminates a short distance above the leading edge of the ramp plate 12.

Each pan of an armoured conveyor is provided with a ramp plate carrying a plurality of angularly movable arms and the double acting rams of the ramp plates are actuated simultaneously by a supply of hydraulic fluid or air under pressure through flexible hoses or pipes 34 from a ram which advances the conveyor towards the working face, and means may be incorporated in the circuit so that the rams 23 are actuated only when the conveyor is being advanced.

The flexible hoses or pipes 34 are normally installed in the space between the bracket 16 and the ramp plate 12 and pass through recesses 35 in the mounting members 21 and 22.

Alternatively the hoses or pipes may be received in the pans of the conveyor and pass through openings in the adjacent side members of the pans and the vertical flanges of the brackets to be connected to the double acting rams 23. Where each pan has a single deck plate 11 as described above, the hoses or pipes may be built into the deck plates of the pans. When the pans are of the twin deck construction as described in the complete specification of our application No. 44,966/65, the flexible hoses or pipes can be passed between the deck plates of each pan.

Upon actuation of the double acting rams 23 the slide bars 27 are reciprocated in the grooves or recesses 28 in the ramp plates 12, which in turn cause the rams to sweep through arcs and displace any coal spillage upwardly and away from the leading edge of the ramp plate. This allows the conveyor to be moved easily towards the working face.

To facilitate reciprocation of the slide bars 27 the recesses or grooves 28 in which the bars are adapted to reciprocate are relieved at 36 for the axial lengths of the recesses or grooves, and a series of openings 37 formed in the lower edge of the slide bars open into the reliefs 36. Opposite ends 38 of the openings 37 are chamfered outwardly to scrape the land and remove any coal spillage or fines therefrom.

It is not essential that the arms 29 are of sector shape as described above as other shapes are equally satisfactory. For example, in the embodiment of FIGURE 7 where corresponding reference numerals have been used to indicate corresponding parts, the arms are parallel sided of a width determined by a radius described about the impulsion pins.

In the embodiment illustrated in FIGURE 8 the angularly movable arms 29 are omitted and the slide bars are provided with projections 39 substantially of the same shape as the sector shaped arms 29 of the embodiment described above with reference to FIGURES 1 to 6. Again corresponding reference numerals have been used to indicate corresponding parts. In this embodiment the projections 39 extend downwardly and disturb and/or load out spillage coal upon reciprocation of the slide bars 27 by actuation of the double acting rams 23.

nI the construction described above the slide bars 27 of each ramp plate 12 are operated by double acting rams 23 associated with each ramp plate. In a modification the slide bars 27 of a plurality of ramp plates, for example four, may be reciprocated by a single ram connected to the slide bar 27 of one of the ramp plates. This is achieved in one construction by interconnecting adjacent ends of the slide bars by rods connected to the slide bars by means of couplings such as pin and slot connections. The couplings are constructed and arranged to cater for misalignment of a ramp plate relative to adjacent ramp plates vertically and horizontally within limits of 4°. In addition the pin and slot connections between adjacent ramp plates have a degree of lost motion to permit relative axial movement to take place between the parts of the connections as the armoured conveyor is snaked over the ground towards the working face. Where the ramp plates are provided with angularly movable arms 29 this movement may cause the arms on one ramp plate to be displaced out of phase relative to the arms of an adjacent ramp plate, and the arc swept by arms on adjacent ramp plates may vary also.

FIGURE 9 shows a further construction for actuating a slide bar 40 which is slidably mounted for reciprocating movement in a groove or recess 41 in a ramp plate 42. The groove or recess leads into a slot 43 in the rear face of the ramp plate which is extended in a radial direction to a width greater than that of the slot 41. The slot 43 extends axially for a distance sufficient to accommodate the range of reciprocating movement of the slide bar and located in the slot is a block 44 which is guided for sliding movement in a radial slot in a projection extending rearwardly from the rear face of the slide bar 40.

The ramp plate 42 is secured to a side member of a pan of an armoured conveyor by means of a bracket (not shown) and mounting members of which one is shown at 45 are located between the ramp plate 42 and the bracket in a similar manner to that described above with reference to the preceding embodiments.

The slide bar 40 is adapted to be reciprocated by rotation of chain sprockets mounted in the mounting members. One such sprocket is shown at 46 and is rotatable about a stub shaft 47 fixed in the mounting member 45 in a position substantially at right angles to the plane of the slide bar 40. A pin 48 fixed at one end in a recess 49 in the outer face of the sprocket 46 offset radially from the axis of rotation of the sprocket is received at its outer end in an opening in the block 44 and rotation of the sprocket causes simultaneous reciprocation of the block 44 is in axial directions with the slide bar and in radial directions relative to the slide bar.

In the embodiment of FIGURES 10 and 11 reciprocation of a slide bar 51 in a groove or recess 52 of a ramp plate 53 is achieved by reciprocation of a rod 54. The rod 54 is slidably mounted for reciprocating movement between spaced bearings 55 mounted on the base flange 56 of a right angled bracket 57 by which the ramp plate 53 is carried. At an intermediate point between the bearings 55 there is mounted on the rod a pair of opposed split collet clamps 58 of which the outer surfaces are inclined away from each other in opposite directions. The collet clamps are enclosed within a sleeve assembly including opposed end parts 60 of which a portion of the inner surface of each end part is inclined in a direction complementary to the inclination of the outer surfaces of an adjacent collect clamp with which it cooperates. Adjacent ends of the sleeve end parts 60 are secured to opposite faces of a non-rotatable member 61 of generally quadrant outline having a bore of a diameter greater than the diameter of the rod. The member 61 has an integral radial projection 62 normal to the plane of the slide bar 51 housing a pin 63 engaging in an opening 64 in the slide bar.

The split collet clamps 58 are normally urged in opposite directions by a spring 65 passing through an opening 66 in the member and in abutment at opposite ends against shoulders 67 on spigots 68 extending towards each other from adjacent ends of the collet clamps 58.

As the rod 54 is reciprocated in opposite directions the sleeve ad collet clamp assembly is taken with it to affect reciprocation of the slide bar 51 by the wedging action of one of the collet clamps 58 with the part of the sleeve end part 60 with which it cooperates, according to the direction of movement of the rod. Normally the amplitude of reciprocation of the rod 54 is chosen to affect the required amplitude of reciprocation of the slide bar. However the amplitude of reciprocation of the rod may increase due to the rod being stretched, or the length of the armoured conveyor changing as it is snaked towards the working face. The amplitude of oscillation of the slide bar 51 is limited to a maximum value by the engagement of the gripping collet clamp 58 with a stop formed by an adjacent end of an adjacent bearing 55. This releases the engagement between that collet clamp and the sleeve end part 60 with which it cooperates to permit the rod to slide through the collet clamp 58 freely, whilst further movement of the slide bar in that direction is prevented.

The ramp plate of each pan of the armoured conveyor is actuated by the rod means described above and each rod means may be actuated by an individual ram, or adjacent ends of the rods may be coupled and may be operated simultaneously by one or more rams.

In another embodiment one or two rotating rods which affect reciprocation of slide bars in slots in ramp plates of an armoured conveyor by acting on the slide bars through a cam mechanism.

I claim:

1. Means for facilitating the movement of an armoured flexible conveyor towards a working face comprising a ramp plate having an outer surface and being adapted to extend downwardly from and inclined away from the conveyor to act as a wedge and lift coal spillage, a plurality of arms having upper and lower ends, means pivotally mounting said arms at their upper ends on said ramp plate, a slide bar reciprocable in an axially extending groove in the outer surface of said ramp plate at a position located below said pivotal mounting means, means pivotally connecting said arms at intermediate points in the lengths thereof to said slide bar, and means for reciprocating said slide bar in said groove at least when the conveyor is adapted to advance towards said working face whereby said arms are angularly movable in opposite directions in arcs about said pivotal mounting means to displace and sweep coal spillage away from the side of the conveyor adjacent to said working face.

2. Means as claimed in claim 1, wherein said arms are of sector shape and are connected at their radially innermost ends to said ramp plate by said pivotal mounting means, the curved radially outer end of each arm being bevelled or chamfered and terminating a short distance above the leading edge of the ramp plate.

3. Means as claimed in claim 1, wherein said arms are parallel-sided having curved outer ends terminating a short distance above a leading edge of said ramp plate, said curved outer ends being bevelled or chamfered.

4. Means as claimed in claim 1, wherein said groove in which said slide bar is adapted to reciprocate is provided with a continuous relief and the lower edge of said slide bar is provided with a plurality of openings which open into said relief.

5. Means as claimed in claim 4, wherein opposite ends of said openings in the slide bar are chamfered outwardly in opposite directions to scrape a land formed by the adjacent edge of said groove to remove any coal spillage therefrom.

6. In an armoured flexible conveyor including a plurality of pans arranged in end to end relationship, joints connecting ends of adjacent pans and having a degree of transverse and vertical flexibility, a scraper conveyor consisting of transverse scraper bars and chains slidably guided in the pans and means for advancing the armoured conveyor towards a working face, wherein the improvement comprises means for facilitating the movement of said armoured flexible conveyor towards the working face, said movement facilitating means comprising a ramp plate corresponding in number to the pans in said conveyor, means mounting one of said ramp plates on each of said pans in a direction extending downwardly from and away from the side of said pan adjacent to the working face to act as a wedge and lift coal spillage, each ramp having an outer surface adjacent to the working face, a slide bar reciprocable in an axially extending groove in the outer surface of said ramp plate, a plurality of arms movable by said slide bar in opposite directions at least in part substantially parallel to the main axis of said armoured conveyor, whereby in at least a part of their movements said arms approach closely the surface of a floor over which the armoured conveyor is movable to displace and sweep coal spillage away from the side of said armoured conveyor adjacent to the working face, and actuating means for reciprocating simultaneously the slide bars in the grooves of the ramp plates.

7. An armoured flexible conveyor as claimed in claim 6, wherein said actuating means comprise double acting rams each connected at opposite ends between a slide bar of a ramp plate and a fixed part relative to which that slide bar is reciprocable, and fluid pressure supply means for actuating said double acting rams simultaneously.

8. An armoured flexible conveyor as claimed in claim 6, wherein means are provided to interconnect the ends of adjacent slide bars and wherein said actuating means comprise a single double acting ram connected to one of said slide bars and fluid pressure supply means are included for actuating said ram.

9. An armoured flexible conveyor as claimed in claim 7 wherein fluid under pressure is supplied to each of said rams through flexible hoses.

10. A conveyor as claimed in claim 8 wherein fluid under pressure is supplied to said ram through flexible hoses.

11. An armoured flexible conveyor as claimed in claim 6, wherein said actuating means comprises rotatable sprockets, pins carried by said sprockets and offset radially from the axes of rotation of said sprockets, and groove means in said slide bars in which said pins are received, said groove means being constructed and arranged to allow simultaneous reciprocation of said pins in axial directions with said slide bars and in radial directions relative to said slide bars, and a continuously driven endless chain for rotating said sprockets simultaneously.

12. An armoured flexible conveyor as claimed in claim 6, wherein said actuating means comprises rods reciprocable in directions parallel to the main axis of said conveyor, clamping means connecting said rods to said slide bars, said clamping means being normally clamped to said rods but releasable to permit free movement of the rods relative to the guide bars when reciprocating movement of the rods exceeds a predetermined maximum value, and means to affect reciprocation of the rods.

13. An armoured flexible conveyor as claimed in claim 12, wherein the clamping means comprises a pair of opposed split collet clamps of which the outer surfaces are inclined away from each other in opposite directions, a sleeve assembly enclosing said collet clamps and including parts of which the inner surface of each part is inclined in a direction complementary to the direction of inclination of the outer surface of the collet clamp with which it is adapted to cooperate, spring means normally urging said collet clamps in a direction away from each other whereby, according to the direction of movement of the rod with which they are adapted to engage, one of said collet clamps grips the rod, said last mentioned collet clamp being engageable with a fixed stop to move it out of engagement with said rod upon movement of said rod in that direction exceeding a predetermined value thereby permitting free sliding movement of said rod relative to said slide bar in that direction.

14. An armoured flexible conveyor as claimed in claim 6, wherein said actuating means comprises rotatable rods acting on said slide bars through cam mechanisms, and means for rotating said rods.

References Cited

UNITED STATES PATENTS 3,363,946   1/1968   Willner _____ 299—43

FOREIGN PATENTS 994,960   6/1965   Great Britain.

EDWARD A. SROKA, Primary Examiner

U.S. Cl. X.R.

299—43